Dec. 22, 1970   D. DANIELS   3,548,480
TOOL LOADER AND UNLOADER
Filed June 13, 1968   2 Sheets-Sheet 1
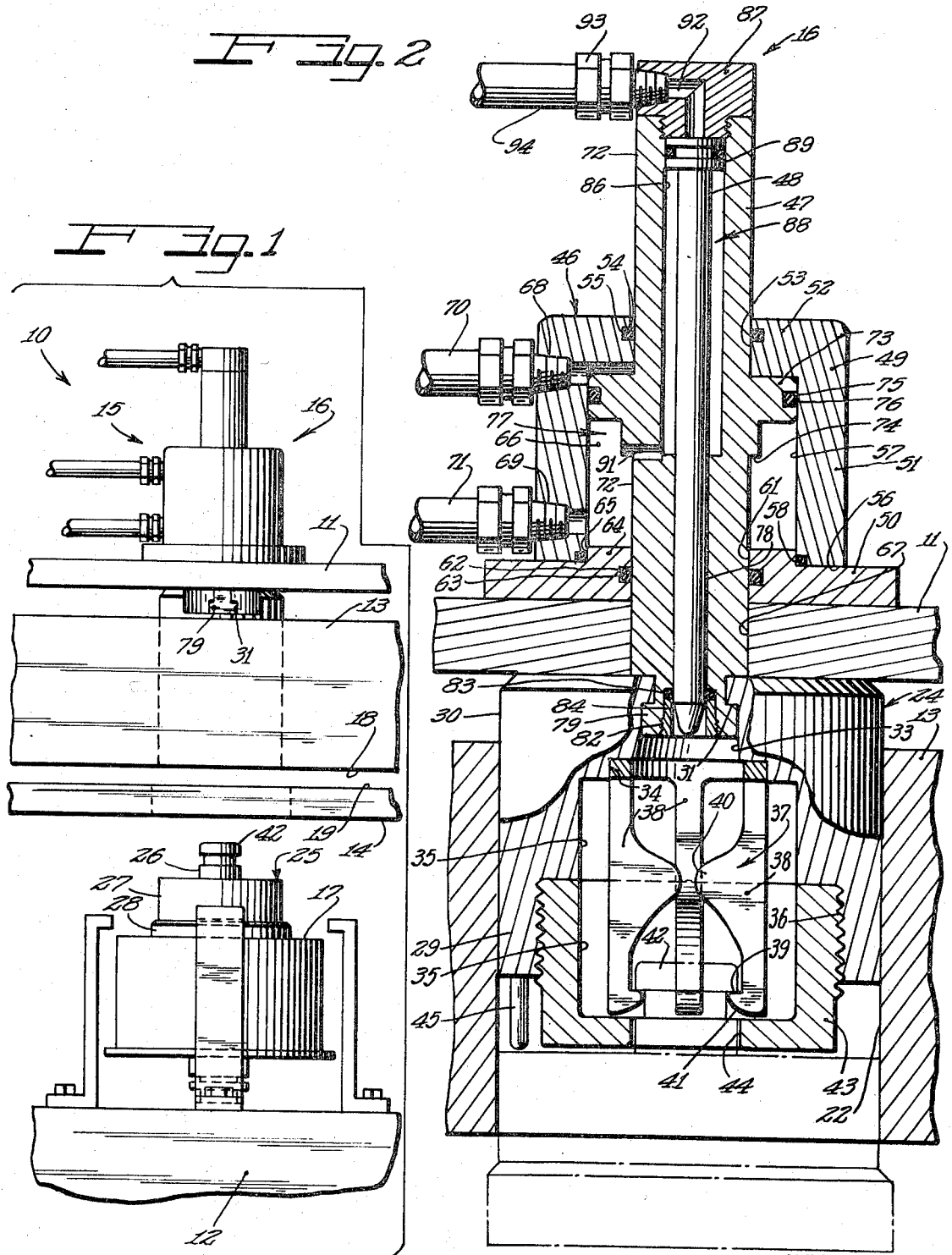
INVENTOR.
Dennis Daniels
BY ATTORNEYS

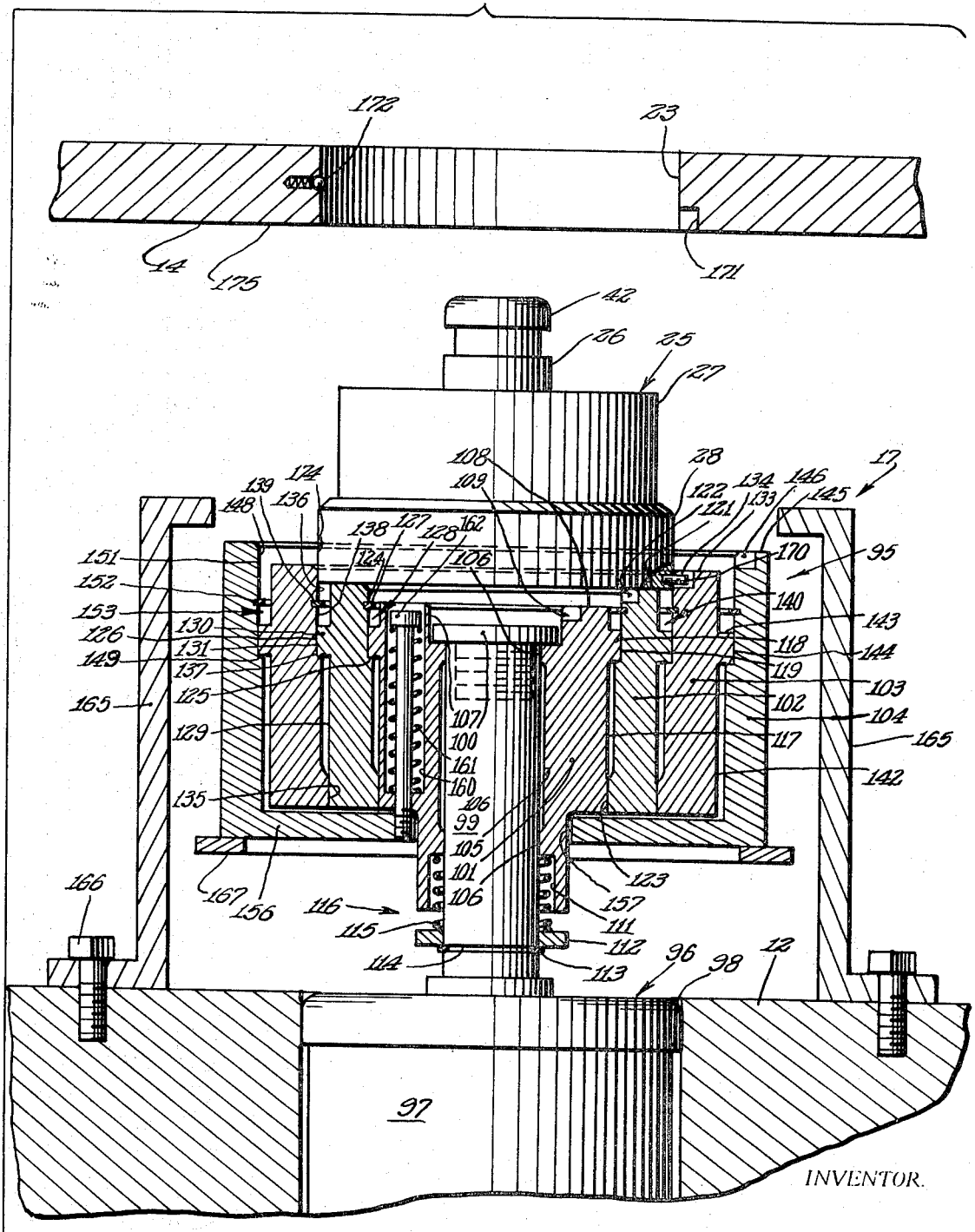

_United States Patent Office_

3,548,480
Patented Dec. 22, 1970

3,548,480
TOOL LOADER AND UNLOADER
Dennis Daniels, Williamsville, N.Y., assignor to Houdaille Industries, Inc., Buffalo, N.Y., a corporation of Delaware
Continuation-in-part of application Ser. No. 629,335, Feb. 6, 1967, which is a continuation-in-part of application Ser. No. 528,856, Feb. 21, 1966. This application June 13, 1968, Ser. No. 736,749
Int. Cl. B23p 19/04
U.S. Cl. 29—243
18 Claims

ABSTRACT OF THE DISCLOSURE

A tool loader and unloader comprising a ram and pin assembly for removing a tool from a tool station of a machine tool and a power actuated loader platform for inserting a tool into the tool station. The loader platform comprises a plurality of concentric sleeves relatively movable with respect to each other to form a stepped recessed tool-receiving surface which positions and aligns the tool as it is being inserted into the tool station.

CROSS-REFERENCES TO RELATED APPLICATIONS

This application is a continuation-in-part of my application for U.S. patent on a Punch Press filed on Feb. 6, 1967, Ser. No. 629,335 now Pat. No. 3,449,991 which is a continuation-in-part of my application for U.S. patent on a Punch Press, filed Feb. 21, 1966, Ser. No. 528,856 which is abandoned.

BACKGROUND OF THE INVENTION (1) Field of the invention

The present invention is directed to a machine tool having a tool loader and unloader particularly one comprising a tool ejecting device and a tool inserting device.

(2) Prior art

In machine tools, a problem of performing a rapid change of tools with a minimum amount of effort and machine-down time has arisen. Heretofore, tools were manually removed from the tool station of the machine which has become burdensome when the tools are bulky and which lengthened the time required for changing a tool used in a machine tool. The problem is doubled in the case of punching machines using both a punch and a die.

SUMMARY OF THE INVENTION

The tool loader and unloader of the present invention includes a ram and an ejection pin which are mounted above the tool station for removing a punch and a die therefrom, and a loading platform provided with a plurality of concentric recesses to receive punches and dies of various sizes and to align them with the tool station to enable insertion therein during movement of the loader platform.

Accordingly it is an object of the present invention to provide a tool loader and unloader which both removes and loads a tool into a tool station of a machine tool.

Another object of the present invention is to provide a tool loader and unloader which receives a tool and positions it for insertion into a tool station of the machine tool.

A still further object of the present invention is to provide a tool loader and unloader which receives and positions tools having different external diameters for insertion into a tool station of a machine tool.

Yet another object of the present invention is to provide a tool loader and unloader for a machine tool which aligns a tool axially and angularly for insertion in a tool station of the machine tool.

Many other advantages, novel features and additional objects of the present invention will become manifest to those versed in the art upon making reference to the detailed description and accompanying sheets of drawings in which a preferred structural embodiment incorporating the principles of the present invention is shown by way of illustrative example.

ON THE DRAWINGS

FIG. 1 is a fragmentary side view of a machine tool having a tool loader and unloader constructed in accordance with the principles of the present invention;

FIG. 2 is an enlarged cros- sectional view of the ejection device of the tool loader and unloader of FIG. 1 with portions shown in elevation; and FIG. 3 is an enlarged fragmentary cross-sectional view of the loading device of the tool loader and unloader of FIG. 1.

AS SHOWN ON THE DRAWINGS

The principles of the present invention are particularly useful when embodied in a machine tool illustrated in FIG. 1 and generally indicated at 10. The machine tool 10 which is illustrated as a turret press comprises a fixed upper frame portion 11 and a fixed lower frame portion 12, an upper turret 13, a lower turret 14, a working station which can be conventional (not illustrated) and a tool loader and unloader assembly generally indicated at 15. The tool loader and unloader assembly 15 comprises a tool ejection means generally indicated at 16 mounted on the upper frame portion 11 and a tool inserting means generally indicated at 17 mounted on the lower frame portion 12.

The turrets 13 and 14 are mounted for rotation on the machine tool 10 and are axially spaced apart so that a lower surface 18 of the upper turret 13 is spaced from an upper surface 19 of the lower turret 14 to allow the insertion of the workpiece between the two turrets. The turrets 13 and 14 are provided with a plurality of tool receiving stations which are each composed of a punch receiving station 22 in the upper turret 13, best illustrated in FIG. 2, and a die receiving station 23 in the lower turret 14, best illustrated in FIG. 3. Each of the punch receiving stations 22 is provided with a tool holder 24 which serves as a punch holder and drive asembly. The machine tool 10 is adapted to utilize a tool such as a tool assembly 25 (FIG. 1) which comprises a punch 26, a stripper sleeve 27 and a die 28 in a nested arrangement.

The tool holder 24 has a body 29 having a cylindrical surface 30 which is in sliding engagement in the punch station 22. The body 29 has a connecting means at one end such as a T-shaped slot 31 for interconnecting the tool holder 24 with a ram (not shown) of the machine tool. The body is provided with a vertical passageway 33 intersecting the T-shaped slot 31 which has a counterbore 34, a second counterbore 35, and a threaded counterbore 36. Disposed in the counterbore 34 is a gripping means 37 which has four resilient arms 38 each of which has a gripping surface 39, an upwardly directed cam surface 40, and a downwardly directed cam surface 41. The punch 26 of the tool assembly 25 is provided with an attachment head 42 which on insertion spreads the cam surfaces 41 apart and which is then engaged by the gripping surfaces 39 to interconnect the punch 26 and the stripper sleeve 27 with the tool holder 24. Threadedly received in the counterbore 36 is an annular member 43 having an axial guide surface 44 through which the punch head 42 passes. The tool holder 24 is provided with a plurality of stripper pins 45 of which one is illustrated that are carried in passageways extending through the body 29. The stripper pins 45 contact the stripper sleeve 27 and are actuated during a punching operation by a mechanism such as a spring or by the hydraulic system which is described in my above-mentioned copending U.S. application, Ser. No. 629,335.

The tool ejection means 16 comprises a housing generally indicated at 46, a ram 47 and an ejection pin 48. The housing 46 comprises a cup-shaped member 49 and a housing plate 50. The cup-shaped member 49 has a cylindrical side wall 51 and a bottom or upper end 52 which has a cylindrical opening 53 which is provided with a groove 54 to receive an O-ring 55 and which opening receives a portion of the ram 47 in a sliding and sealed engagement. The side wall 51 has an annular lower end surface 56 and an inner cylindrical surface 57 which is concentric with the opening 53 and terminates adjacent to the end surface 56, at an annular groove 58 which receives a seal such as an O-ring 59. The end plate 50 has a cylindrical opening 61 having a groove 62 which receives a seal such as an O-ring 63. The plate 50 is provided with a cylindrical projection 64 having a cylindrical concentric surface 65 which engages the inner surface 57 of the cup-shaped member 49 to form a joint between the end plate 50 and the cup-shaped member 49 to define a pressure chamber 66. The upper frame member 11 has a cylindrical opening 67 and the housing member 46 is mounted on the frame member 11 with the openings 53 and 61 in alignment with the opening 67. The side wall 51 of the housing member 46 is provided with a pair of ports 68, 69 which are threaded to receive connections of fluid supply lines 70, 71 respectively.

The ram 47 has a pair of cylindrical outer surfaces 72, an integral piston 73 and a shoulder 74 adjacent the piston 73 which piston is provided with a peripheral groove 75 receiving an O-ring seal 76. The ram 47 is disposed in the housing with the surfaces 72 in sliding engagement with the openings 53 and 61 and with the piston 73 in sliding engagement with the inner surface 57 of the housing 46. The piston 73 coacts with the housing 46 to form a ram actuating means 77, which is a double acting fluid actuator.

The ram 47 which is a hollow rod is provided with an axially extending passageway 78 which slidably receives the ejection pin 48. The ram 47 which extends through the openings 67 of the upper frame member 11 is provided with an end 79 which has a T-shaped cross section to coact with the T-shaped slot 31 to interconnect the ram 47 with the tool holder 24. The T-shaped end 79 is provided with a threaded counterbore 82 which is in alignment with the passageway 78 and the counterbore 82 receives a seal such as an O-ring 83 which is held by a threaded annular retainer 84.

At the opposite end of the passageway 78, the ram 47 is provided with a counterbore 86 which is threaded at one end to receive a threaded cap member 87. The counterbore 86 forms a pressure chamber generally indicated at 88 to receive a piston 89 which is integral with the ejection pin 48. The piston 89 and chamber 88 define an actuating means 90 which is a double action fluid actuator. The pressure chamber 88 has one port 91 which extends through the shoulder 74 and which interconnects the chamber 88 with the pressure chamber 66 on the retraction-effecting sides of both pistons 73 and 89. The cap member 87 is provided with a port 92 which receives a threaded coupling 93 of a hydraulic pressure line 94 which extends to a source of pressurized fluid.

The tool inserting means 17 comprises a platform generally indicated at 95 and an actuating means generally indicated at 96 as best illustrated in FIG. 3. The actuating means 96 has a cylinder 97 received in an opening 98 in the lower frame portion 12. A rod or ram 99 extends from the cylinder 97 and is reciprocated by the piston disposed in the cylinder. The ram 99 has a cylindrical surface which terminates at an upper end in an annular retainer or head 100.

The platform 95 comprises an inner member or sleeve 101, a pair of concentric sleeves 102, 103 and a concentric cup member 104. The inner member 101 has a passageway 105 having cylindrical guide portions 106, 106 which slidably receive the cylindrical surfaces of the ram 99. The passageways 105 at one end has a shouldered tool-receiving recess 107 in which the head 100 of the ram 99 is received, and which recess 107 has a depth greater than the thickness of the head 100. The inner member 101 has an end surface 108 adjacent the recess 107 which is provided with an angular keying means 109 which is a radial recess or groove. At the opposite end, the inner member 101 is provided with a counterbore 111.

The ram 99 is provided with a washer 112 which rests on a retainer 113 such as a snap ring disposed in a groove 114. A spring 115 is disposed against the washer 112 and in the counterbore 111 to bias the inner member 101 so that the head 100 of the ram 99 is engaged by the bottom of the recess 107. The interconnection between the ram 99 and the inner member 101 formed by the head 100 and the retainer 113 provides a lost-motion connection indicated at 116.

The inner member 101 is provided with a cylindrical outer surface 117 which has an annular retainer 118 having a cylindrical guide surface 119.

The sleeve 102 has an end surface 121 having an angular keying means 122 and an inner cylindrical surface 123 which is in sliding engagement with the outer surface 117 of the inner member 101. The sleeve 102 is provided with a cylindrical surface or counterbore 124 adjacent the end surface 121 to form an internal shoulder 125. The counterbore 124 is concentric with the cylindrical surface 123 and in sliding engagement with the inner member guide surface 119. The cylindrical surface 124 is provided with a retainer 127 which coacts with the retainer 118 and the shoulder 125 to provide an axial lost-motion connection generally indicated at 128. The axial lost-motion connection 128 allows axial movement between the inner member 101 and the sleeve 102 from the position illustrated in FIG. 3 to a position in which the end surface 121 of the sleeve 102 is in substantially the same plane as the end surface 108 of the inner member 101.

The sleeve 102 has an outer cylindrical surface 129 provided with an annular retainer 130 which has a cylindrical guide surface 131. Disposed on the sleeve 102 is the second concentric sleeve 103 having an upper end surface 133 having an angular keying means which is a radial recess or groove 134. The sleeve 103 has a cylindrical inner surface 135 in sliding engagement with the outer surface 129 of the sleeve 102 and is provided with a counterbore 136 adjacent the end 133 forming an internal shoulder or retainer 137. The counterbore 136 has a cylindrical inner surface 138 which is slidably received on the guide surface 131 of the sleeve 102. The surface 138 is provided with a retainer 139 such as a snap ring disposed in a groove which coacts with the shoulder 137 and the retainer 130 to form a lost-motion connection generally indicated at 140. The sleeve 103 has an outer cylindrical surface 142 having an annular retainer 143 which has an outer cylindrical surface guide portion 144.

The cup member 104 has an upper end surface 145 provided with a radial locating recess or groove 146 which forms an angular keying means. The cup 104 has a counterbore 148 adjacent the end 145 which forms an internal shoulder or retainer 149. The counterbore 148 has a cylindical surface 151 which has sliding engagement with the guide surface 144 of the sleeve 103 and is provided with a retainer 152 which coacts with the internal shoulder 149 and the retainer 143 to form a lost-motion connection 153. The cup 104 has a bottom plate 156 which extends underneath and terminates in an opening 157 adjacent the inner member 101.

The inner member 101 is provided with a plurality of bores 160 each of which receives a spring 161 received on a head screw 162 which is disposed in the bore 160 and is threadedly received in the bottom plate 156 of the cup member 104. The spring 161 biases all of the lost-motion connections 128, 140 and 153 so that the retainers 118, 130 and 143 are urged against the shoulders 125, 137 and 149 respectively. The lost-motion connections 128, 140 and 153 are each of a length to allow the end surfaces 108, 121, 133 and 145 to lie substantially in the same plane. In the free position illustrated, the end surfaces 108, 121, 133 and 145 each lie in a plane axially spaced from the respective planes formed by the other end surfaces so that the platform is provided with a plurality of concentric tool-receiving recesses with a stepped cross section.

The tool inserting means 17 further includes four stops 165 of which two are illustrated that are attached by fastening means such as bolts 166 to the lower frame member 12. The stops 165 are engageable with an annular ring 167 which is attached to the bottom plate 156 of the cup-shaped member 104.

The die 28 of the tool assembly 25 has a locating pin 170 which is a complemental means to an angular keying means or positioning slot 171 of the die station 23. Similar keying is provided for the punch and stripper sleeve assembly 26, 27. The die station 23 is also provided with a ball detent 172 which coacts with a depression 174 on the die 28 to axially hold the die 28 in the die station 23.

In operation, the turret 13 is rotated until the T-shaped slot 31 of the tool holder 24 becomes engaged with the T-shaped end 79 of the ram 47. After the interconnection is made, pressurized fluid is introduced through the line 70 to act on the piston 73 to cause the piston 73 to be reciprocated downwardly from the position illustrated until the shoulder 74 engages the housing plate 50. The movement of the ram 47 reciprocates the tool holder 24 downwardly in the die station 22 to a position where any punch and stripper assembly 26, 27 are rested on the die 28, the die 28 being released by the ram 47 from the detent 172, and the tool assembly 25 thus being in a lowered position to be unloaded.

Pressurized fluid is then introduced through the line 94 to act on the piston 89 to cause it to be reciprocated downwardly so that the pin 48 engages the cam surfaces 40 of the resilient fingers 38 to cause the gripping surfaces 39 to be moved radially outwardly to release the head 42 of the punch 26. Upon release from the gripping means 37, the punch 26 and the stripper sleeve 27 will move downwardly out of the punch station 22 and pass through the die station 23 to be received on the tool inserting means 17. If the punch 26 or the stripper sleeve 27 should tend to stick in the tool station 22, the ejection pin 48 will engage the punch head 42 and urge it out of the tool holder 24.

Upon completion of the removal of the tool assembly 25, a different tool assembly can be inserted. In preparation for inserting a different tool assembly, fluid pressure is introduced through the line 71 to act on the pistons 73 and 89 to urge them toward the retracted position. However, during the early stages of introducing fluid into the pressure chamber 66 via the line 71, fluid pressure is maintained above the piston 73 or in the pressure line 70 while the conduit or pressure line 94 is connected to a fluid exhaust line so that the fluid introduced through the conduit 71 forces only the piston 89 of the ejection pin 48 to the retracted position while the ram 47 remains with the shoulder 74 in contact with the housing plate 50. With the ejection pin 48 withdrawn the resilient arms 38 of the gripping means 37 resume the position illustrated in FIG. 2.

The tool holder 24 is held by the ram 47 in the lower position and is ready to receive any tool assembly 25. The pressure is maintained above the piston 73 until after completion of the step of connecting the different tool assembly to the tool holder 24.

A nested tool assembly 25 is disposed on the platform 95 in one of the recesses formed by the sleeves 102, 103, the inner member 101 and the cup-shaped member 104. As illustrated the die 28 rests in the recess at the end of the counterbore 136 by the sleeves 102 and 103 with the locating pin 170 received in the angular keying means 134 to angularly orient the tool assembly 25 before reception in the tool station.

With the tool assembly 25 disposed on the platform 95, as illustrated, the tool assembly is inserted into the tool station by the reciprocation of the actuating means 96. As the ram 99 moves upwardly, the inner member 101, the sleeves 102, 103 and the cup-shaped member 104 retain their relative axial positions until the cup-shaped member 104 is substantially in contact or in direct contact with the bottom surface 175 of the turret 14. The retainer ring 167 limits upward motion of the cup-shaped member 104. Further movement of the ram 99 effects a taking up of the motion of the various lost-motion connections 116, 128, 140 and 153 in indeterminate order, except that owing to the mass of the tool assembly 25, the lost-motion connection to be taken up will be the one that defines the upper end of the recess in which the tool assembly 25 is disposed, namely the lost-motion connection 140 of the illustrated example. As each of the lost-motion connections 116, 128 and 153 in this example is taken up, the upper surfaces 100 and 108 beneath the tool assembly 25 become coplanar with the bottom of such tool assembly 25, and each upper surface 133 which encircles the tool assembly 25 becomes coplanar with the upper surface 145. Such movement causes the springs 115 and 161 to become progressively compressed, and finally the sleeve 102, in this example, is moved relatively to the sleeve 103 to seat the die 28 and to snap the punch head 42 into the gripping means 37, thereby temporarily eliminating all of the stepped recesses. (This relationship of the elements of the tool inserting means 17 is that which is initially assumed in preparation for reception of a tool assembly 25 that is about to be unloaded.) Once the connection between the punch 26 and the gripping means 37 has been completed, the fluid or fluid pressure above the piston 73 is removed by venting or connecting the line 70 to a fluid exhaust line and the ram 47 and the tool holder 24 are retracted to a retracted loaded-tool position (FIG. 2) by the pressure introduced through the line 71 which pressure acts on the retraction-effecting side of the piston 73. When the tool holder 24 is retracted, the punch 26 and the stripper sleeve 27 are drawn into the punch station 22 to complete the tool loading operation.

The provision of a plurality of sleeves 102, 103 on the inner member 101 provides four concentric tool-receiving recesses of four different diameters so that the tool loading platform 95 can handle tool assemblies having one of four different external diameter dies 28.

During an unloading operation, the tool platform 95 is moved to be adjacent the lower surface 175 of the turret 14 so that a tool assembly 25 ejected from the tool station by the tool ejection means 16 will be received on the platform. The use of the platform 95 to receive the ejected tool assembly prevents tool damage due to falling through a great distance.

Once the tools are received on the platform, the actuating means 96 is retracted so that the ejected tool assembly 25 can be removed from the platform and a new tool assembly 25 for insertion can be placed on the platform within the appropriate positioning recess.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. In a machine tool, the combination comprising:
   (a) a frame;
   (b) at least one tool station supported on said frame for receiving tooling including a tool;
   (c) tool ejecting means mounted on said frame beyond and independently of said tool station, said ejection means and said tool station being relatively movable into a position of concentric alignment with each other for functioning jointly; and
   (d) tool inserting means mounted on said frame for coaction with said tool ejection means.

2. A machine tool according to claim 1, in which said tool inserting means includes a platform movable between positions adjacent to and remote from said tool station, and stationary stop means directly engageable with said movable platform to define said position adjacent said tool station.

3. In a machine tool, the combination comprising:
   (a) a frame;
   (b) a tool station supported on said frame for receiving a tool;
   (c) tool ejection means mounted on said frame in alignment with said tool station; and
   (d) tool inserting means mounted on said frame in alignment with said tool ejection means for coaction therewith, said tool inserting means including an actuator, a ram drivably secured to said actuator, and a platform secured to said ram for supporting a tool, said platform being reciprocable in response to operation of said actuator between a position adjacent to said tool station and a position remote from said tool station, said platform having a shouldered tool-receiving recess on its upper surface and a passageway extending downwardly from said recess and slidably receiving said ram, said ram having a pair of retainers, one of said retainers being disposed on the upper end of said ram and received in said recess, and the other of said retainers being disposed on said ram to form an axial lost-motion connection between said platform and said ram.

4. A machine tool according to claim 3, wherein said lost-motion connection includes means for biasing said platform against said one retainer.

5. A machine tool according to claim 4 wherein said biasing means is a spring surrounding said ram.

6. In a machine tool, the combination comprising:
   (a) a frame;
   (b) a tool station supported on said frame for receiving a tool;
   (c) tool ejection means mounted on said frame in alignment with said tool station; and
   (d) tool inserting means mounted on said frame in alignment with said tool ejection means for coaction therewith, said tool inserting means including an actuator, a platform secured to said actuator for supporting a tool, said platform being reciprocable in response to operation of said actuator between a position adjacent to said tool station and a position remote from said tool station, said platform comprising a cup member, sleeve means in said cup member defining a plurality of stepped concentric tool-receiving recesses, and means within said cup member so as to render coplanar the upper surfaces of said cup member and said sleeve means.

7. A machine tool according to claim 6, including a plurality of said sleeve means slidably connected together, and spring means acting between said cup member and one of said sleeve means and urging both of said sleeve means toward their recess-defining poitions.

8. In a machine tool, the combination comprising:
   (a) a frame;
   (b) a tool station supported on said frame for receiving a tool;
   (c) tool ejection means mounted on said frame in alignment with said tool station; and
   (d) tool inserting means mounted on said frame in alignment with said tool ejection means for coaction therewith, said tool inserting means including a member having an outer guide surface, a sleeve having an inner guide surface disposed on said member with said guide surfaces in sliding engagement for relative telescopic movement therebetween, and the ends of said member and said sleeve jointly defining a tool-receiving recess opening toward said tool station.

9. A machine tool according to claim 8, in which coacting retainers are provided on said sleeve and member to define an axial lost-motion connection therebetween and enabling said telescopic movement between a first position with the end of said member axially spaced from the adjacent end of said sleeve, and a second position with said ends substantially in the same plane.

10. A machine tool according to claim 9, wherein said end of said sleeve is provided with angular keying means engageable with complemental means on a tool.

11. A machine tool according to claim 9, including a spring biasing said sleeve and member toward said first position.

12. A machine tool according to claim 1, including a tool holder slidably disposed in said tool station, the adjacent end of said tool ejection means being detachably slidably secured to said tool holder in response to the relative movement of said tool ejection means and said tool station into concentric alignment.

13. A machine tool according to claim 1, wherein said tool ejction means includes:
   (a) a ram mounted for reciprocation between a retracted loaded-tool position withdrawn from said tool station, and an extended position inserted into said tool station for loading, unloading and ejecting the tool; and
   (b) actuating means for reciprocating the ram between said positions.

14. A machine tool according to claim 13, including a tool holder slidably disposed in said tool station, one end of said ram being detachably slidably secured to said tool holder in response to the relative movement of said tool ejection means and said tool station into concentric alignment for selectably reciprocating said tool holder.

15. A machine tool according to claim 14, wherein said tool ejection means further includes:
   (a) an ejection pin mounted for reciprocation into said tool holder and operative to release any tool held by said tool holder; and
   (b) actuating means for reciprocating said ejection pin independently of the reciprocation of said ram.

16. In a machine tool, the combination comprising:
   (a) a frame;
   (b) a tool station supported on said frame for receiving a tool;
   (c) tool ejection means mounted on said frame in alignment with said tool station, said tool ejection means including:
       (1) a ram slidably guided by said frame for reciprocation between a retracted loaded-tool position withdrawn from said tool station and a second position extending into said tool station;
       (2) an ejection pin slidably carried by said ram for reciprocation relative to said ram for ejecting any tool from the tool station;
       (3) pin actuating means acting between said ram and said pin for reciprocating said pin relatively to said ram; and
       (4) ram actauting means acting between said frame and said ram for reciprocating said ram between said positions; and
   (d) tool inserting means mounted on said frame in alignment with said tool ejection means for coaction therewith.

17. A machine tool according to claim 16, wherein:
(a) said ram actuating means comprises a first double acting fluid actuator having a piston attached to said ram;
(b) said pin actuating means comprising a second double acting fluid actuator having a piston attached to said pin; and
(c) a means defining one of the ports of said second actuator which fluidly connects said actuators together at the retraction-effecting sides of said pistons.

18. A machine tool according to claim 16, wherein both of said actuating means comprise fluid actuators, said fluid actuator for said ram including a hollow rod which serves as a reciprocable cylinder for the other of said fluid actuators.

References Cited
UNITED STATES PATENTS 3,288,032  11/1966  Pankonin et al. _____ 29—568X ANDREW R. JUHASZ, Primary Examiner Z. R. BILINSKY, Assistant Examiner U.S. Cl. X.R.

29—568; 83—552, 563